(12) United States Patent
Ma

(10) Patent No.: US 10,475,167 B2
(45) Date of Patent: Nov. 12, 2019

(54) METHOD AND DEVICE FOR IMAGE ROTATION, AND APPARATUS FOR IMAGE FORMATION

(71) Applicant: Zhuhai Seine Technology CO., Ltd., Zhuhai (CN)

(72) Inventor: Yangxiao Ma, Zhuhai (CN)

(73) Assignee: ZHUHAI SEINE TECHNOLOGY CO., LTD., Zhuhai (CN)

( * ) Notice: Subject to any disclaimer, the term of this patent is extended or adjusted under 35 U.S.C. 154(b) by 105 days.

(21) Appl. No.: 15/838,685

(22) Filed: Dec. 12, 2017

(65) Prior Publication Data

US 2018/0174280 A1 Jun. 21, 2018

(30) Foreign Application Priority Data

Dec. 16, 2016 (CN) .......................... 2016 1 1170955

(51) Int. Cl.
*G06T 5/00* (2006.01)
*G06T 7/70* (2017.01)
*G06T 3/60* (2006.01)

(52) U.S. Cl.
CPC ............... *G06T 5/006* (2013.01); *G06T 3/60* (2013.01); *G06T 7/70* (2017.01); *G06T 5/002* (2013.01); *G06T 2207/20024* (2013.01); *G06T 2207/20172* (2013.01)

(58) Field of Classification Search
CPC . G06T 2207/20024; G06T 2207/20172; G06T 7/70; G06T 3/60; G06T 5/05; G06T 5/002
See application file for complete search history.

(56) References Cited

U.S. PATENT DOCUMENTS

| 6,763,143 B1* | 7/2004 | Nagao | G06T 3/4007 |
| | | | 382/261 |
| 2009/0110328 A1* | 4/2009 | Minamino | G06T 3/60 |
| | | | 382/289 |
| 2009/0268264 A1* | 10/2009 | Minamino | H04N 1/3878 |
| | | | 358/474 |
| 2010/0054595 A1* | 3/2010 | Demandolx | G06K 9/3275 |
| | | | 382/170 |

\* cited by examiner

*Primary Examiner* — Leon Flores
(74) *Attorney, Agent, or Firm* — Anova Law Group PLLC

(57) ABSTRACT

Method and device for image rotation, and apparatus for image formation are provided. The method includes obtaining a tilt angle and size information of a to-be-processed image data, and obtaining position information of a target pixel corresponding to each rotated original pixel by performing a calculation based on the tilt angle and the size information and position information of each original pixel. The method also includes obtaining an enhancement parameter value and an edge parameter value by filtering the original pixel. Further, the method includes performing a two-dimensional interpolation process based on neighboring pixels of the original pixel, the enhancement parameter value and the edge parameter value, and obtaining a target pixel value of the target pixel according to an original pixel value of the original pixel, the enhancement parameter value, and the edge parameter value, thereby obtaining a target image corresponding to the rotated to-be-processed image data.

20 Claims, 6 Drawing Sheets

| i-1, j-1 | i, j-1 | i+1, j-1 |
|---|---|---|
| i-1, j | i, j | i+1, j |
| i-1, j+1 | i, j+1 | i+1, j+1 |

Figure 7

| i, j | i+1, j |
|---|---|
| i, j+1 | i+1, j+i |

Figure 8

METHOD AND DEVICE FOR IMAGE ROTATION, AND APPARATUS FOR IMAGE FORMATION

CROSS-REFERENCES TO RELATED APPLICATIONS

This application claims the priority of Chinese patent application No. 201611170955.7, filed on Dec. 16, 2016, the entirety of which is incorporated herein by reference.

FIELD OF THE DISCLOSURE

The present disclosure generally relates to the field of image processing technology and, more particularly, relates to a method and device for image rotation, and an apparatus for image formation.

BACKGROUND

An image scanning apparatus, a copying apparatus, a fax apparatus, and an optical character reading (OCR) apparatus may be used to read a document. However, when an original document is read while being inclined, an inclined image may be obtained, which provides reduced reading quality of the image data. A conventional solution includes use of an image reading apparatus that electronically corrects the inclined image by rotating the image data.

Such image rotation process is usually performed using a rotation matrix. When the coordinates of an arbitrary pixel in an original image are (x, y) and the coordinates of the pixel corresponding to a converted image are (x*, y*), the image may be rotated using the following formula:

$$\begin{bmatrix} x^* \\ y^* \end{bmatrix} = \begin{bmatrix} \cos\theta & -\sin\theta \\ \sin\theta & \cos\theta \end{bmatrix} \begin{bmatrix} x \\ y \end{bmatrix}.$$

However, the conventional image rotation process using the rotation matrix easily results in serrated edge of the rotated image, thereby reducing the sharpness of image reading. The disclosed method, device and apparatus are directed to solve one or more problems set forth above and other problems in the art.

BRIEF SUMMARY OF THE DISCLOSURE

One aspect of the present disclosure includes a method for image rotation. The method includes obtaining a tilt angle and size information of a to-be-processed image data. The method also includes obtaining position information of a target pixel corresponding to each rotated original pixel by performing a calculation based on the tilt angle and the size information of the to-be-processed image data and position information of each original pixel. In addition, the method includes obtaining an enhancement parameter value and an edge parameter value by filtering the original pixel. Further, the method includes performing a two-dimensional interpolation process based on a plurality of neighboring pixels of the original pixel, the enhancement parameter value, and the edge parameter value, and obtaining a target pixel value of the target pixel corresponding to the original pixel according to an original pixel value of the original pixel, the enhancement parameter value, and the edge parameter value, thereby obtaining a target image corresponding to the rotated to-be-processed image data.

Another aspect of the present disclosure includes a device for image rotation. The device includes a memory storing program instructions for a method for image rotation, and one or more processors coupled to the memory. When executing the program instructions, the one or more processors are configured for obtaining a tilt angle and size information of a to-be-processed image data. The one or more processors are also configured for obtaining position information of a target pixel corresponding to each rotated original pixel by performing a calculation based on the tilt angle and the size information of the to-be-processed image data and position information of each original pixel. In addition, the one or more processors are configured for obtaining an enhancement parameter value and an edge parameter value by filtering the original pixel. Further, the one or more processors are configured for performing a two-dimensional interpolation process based on a plurality of neighboring pixels of the original pixel, the enhancement parameter value, and the edge parameter value, and obtaining a target pixel value of the target pixel corresponding to the original pixel according to an original pixel value of the original pixel, the enhancement parameter value, and the edge parameter value, thereby obtaining a target image corresponding to the rotated to-be-processed image data.

Another aspect of the present disclosure includes an apparatus for image formation. The apparatus includes a memory storing program instructions for a method for image formation, and one or more processors coupled to the memory. When executing the program instructions, the one or more processors are configured for obtaining a to-be-processed image data by scanning an original document or receiving from external, and detecting a tilt angle and size information of the to-be-processed image data, used for image rotation. The image rotation includes obtaining the tilt angle and the size information of the to-be-processed image data, obtaining position information of a target pixel corresponding to each rotated original pixel by performing a calculation based on the tilt angle and the size information of the to-be-processed image data and position information of each original pixel, obtaining an enhancement parameter value and an edge parameter value by filtering the original pixel, and performing a two-dimensional interpolation process based on a plurality of neighboring pixels of the original pixel, the enhancement parameter value, and the edge parameter value, and obtaining a target pixel value of the target pixel corresponding to the original pixel according to an original pixel value of the original pixel, the enhancement parameter value, and the edge parameter value, thereby obtaining a target image corresponding to the rotated to-be-processed image data.

Other aspects of the present disclosure can be understood by those skilled in the art in light of the description, the claims, and the drawings of the present disclosure.

BRIEF DESCRIPTION OF THE DRAWINGS

FIG. 7 illustrates an exemplary original pixel consistent with various disclosed embodiments of the present disclosure;

FIG. 8 illustrates another exemplary original pixel consistent with various disclosed embodiments of the present disclosure;

DETAILED DESCRIPTION

Reference will now be made in detail to exemplary embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

Figure 1:
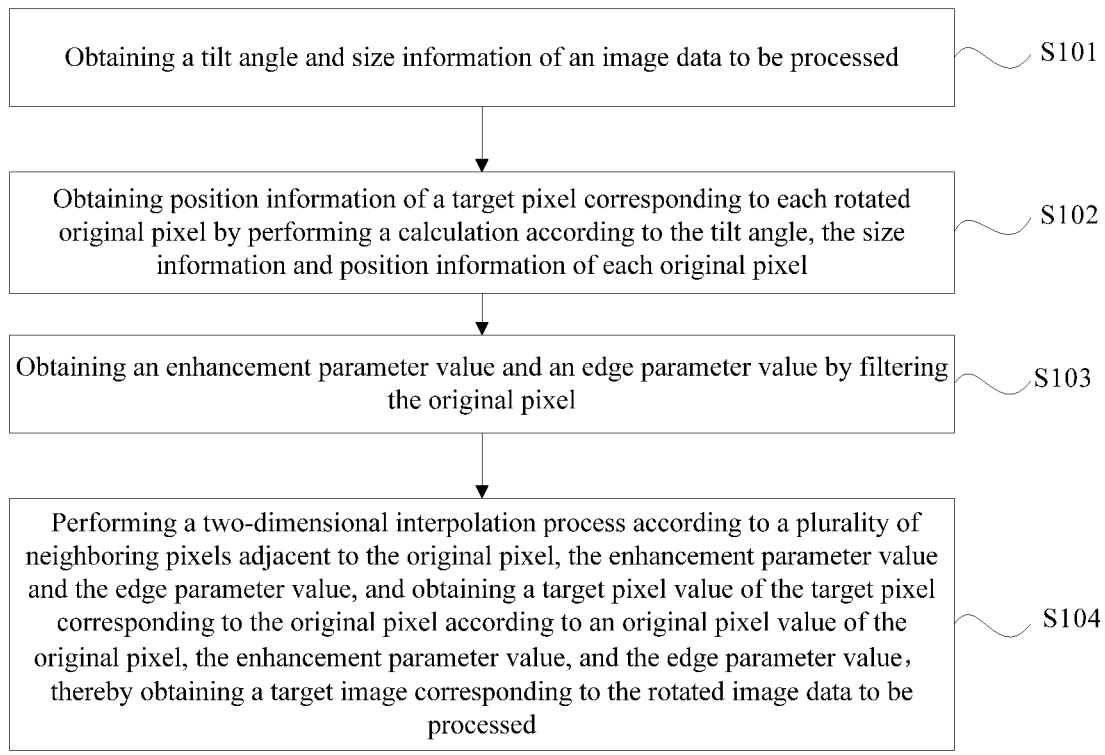
FIG. 1 illustrates a flow chart of an exemplary method for image rotation consistent with various disclosed embodiments of the present disclosure.
Figure 2:
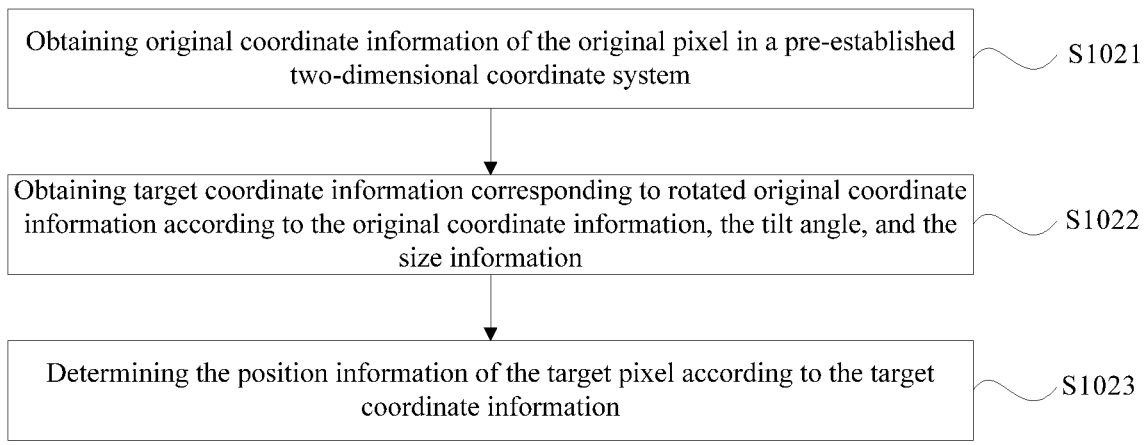
FIG. 2 illustrates a flow chart for an exemplary process for obtaining position information of a target pixel consistent with various disclosed embodiments of the present disclosure.
Figure 3:
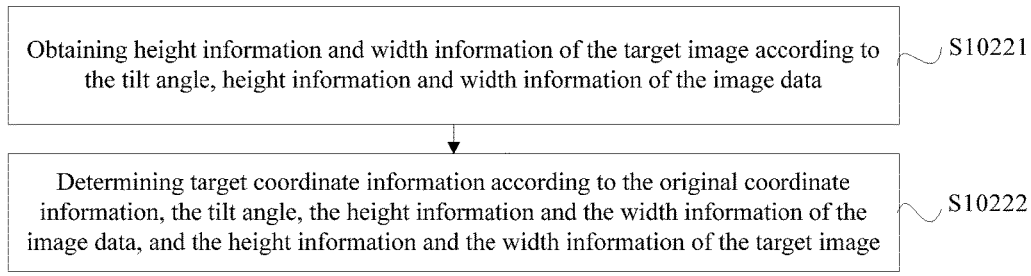
FIG. 3 illustrates a flow chart for an exemplary process for obtaining target coordinate information consistent with various disclosed embodiments of the present disclosure.
Figure 6:
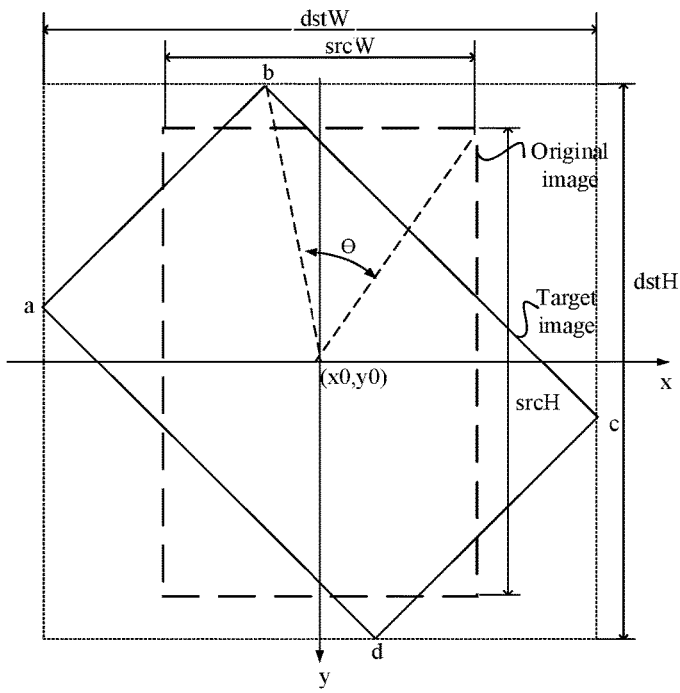
FIG. 6 illustrates an exemplary image data consistent with various disclosed embodiments of the present disclosure.

According to various embodiments of the present disclosure, FIG. 1 illustrates a flow chart of an exemplary method for image rotation; FIG. 2 illustrates a flow chart for an exemplary process for obtaining position information of a target pixel; and FIG. 3 illustrates a flow chart for an exemplary process for obtaining target coordinate information; while FIG. 6 illustrates an exemplary image data; and FIG. 7 illustrates an exemplary original pixel.

As an example, as illustrated in FIGS. 1-3 and 6-7, a method for image rotation to rotate image data is provided. An execution subject of the method for image rotation may include an exemplary device for image rotation. In one embodiment, the method for image rotation may include the following as illustrated in FIG. 1.

In S101: Obtaining a tilt angle and size information of the image data to be processed (also referred to as "to-be-processed image data"). In one embodiment, the image data to be processed may be a pre-stored image data. In another embodiment, the image data to be processed may be a real-time inputted image data. In one embodiment, obtaining the tilt angle and the size information may include analyzing the image data to be processed to detect an original document area, such that a tilt degree of the original document may be automatically detected based on the original document area to obtain the tilt angle needed to rotate to correct the tilt. The size information of the image data to be processed may include a height and a width of the image data. After obtaining the tilt angle and the size information of the image data, the tilt angle and the size information may be stored in a preset storage area as correction parameters of a tilt correction processing performed on the image data. In another embodiment, the tilt angle and the size information of the image data may be obtained based on user input.

In S102: Obtaining position information of a target pixel corresponding to each rotated original pixel (i.e., each original pixel after rotation) by performing a calculation according to the tilt angle and the size information of the to-be-processed image data and position information of each original pixel. The position information of the original pixel may be determined by original coordinate information of the original pixel. The original coordinate information of the original pixel may be (i, j), the target coordinate information (p, q) of the target pixel may be obtained by performing a calculation according to the tilt angle needed to rotate the image data, the size information and the position information of the original pixel. The target coordinate information (p, q) of the target pixel may determine the position information of the target pixel, such that the target pixel, corresponding to the original pixel and in a target image corresponding to the rotated image data, may be obtained. In one embodiment, obtaining the position information of the target pixel corresponding to each rotated original pixel by performing the calculation according to the tilt angle, the size information and the position information of each original pixel may include the following, for example, as illustrated in FIG. 2.

FIG. 2 illustrates a flow chart for an exemplary process for obtaining position information of a target pixel corresponding to each rotated original pixel by performing a calculation according to a tilt angle, size information and position information of each original pixel consistent with various disclosed embodiments.

In S1021: Obtaining original coordinate information of the original pixel in a pre-established two-dimensional coordinate system. The two-dimensional coordinate system may be pre-established, and may be set by those skilled in the art according to specific design requirements. In one embodiment, the two-dimensional coordinate system may be established based on the image data to be processed, to effectively ensure the accuracy and reliability of the acquired original coordinate information.

In S1022: Obtaining target coordinate information corresponding to rotated original coordinate information according to the original coordinate information, the tilt angle, and the size information. The size information may include height information and width information of the image data. Further, obtaining the target coordinate information corresponding to rotated original coordinate information according to the original coordinate information, the tilt angle, and the size information may include the following, for example, as illustrated in FIG. 3.

FIG. 3 illustrates a flow chart for an exemplary process for obtaining target coordinate information corresponding to rotated original coordinate information according to the original coordinate information, a tilt angle, and size information consistent with various disclosed embodiments.

In S10221: Obtaining height information and width information of the target image according to the tilt angle, the height information and the width information of the image data.

In S10222: Determining the target coordinate information according to the original coordinate information, the tilt angle, the height information and the width information of the image data, and the height information and the width information of the target image.

In one embodiment, the target coordinate information may be determined using the following formulas. FIG. 6 illustrates an exemplary image data consistent with various disclosed embodiments.

As illustrated in FIG. 6, original pixel value corresponding to the original coordinate information (i, j) of the original pixel may be f(i, j). Target pixel value corresponding to the target coordinate information (p, q) of the target pixel may be DST(p, q). The height of the image data may be SrcH, the width thereof may be SrcW, and the tilt angle thereof may be Θ. The width of the target image may be dstW and the height thereof may be dstH. Referring to FIG. 6, the image data to be processed may correspond to a dotted line image, and the target image after rotating the image data to be processed may correspond to a solid line image. The original image may be rotated left and right. In one embodiment, the original image is rotated left with a center point of the image data (the original coordinate information may be (x0, y0)) as an origin as an example, the rotation matrix P may be expressed as:

$$P = \begin{bmatrix} \cos\theta & -\sin\theta \\ \sin\theta & \cos\theta \end{bmatrix}.$$

Therefore, the size information of the target image and the size information of the image data to be processed may satisfy the following relationship:

$$\begin{bmatrix} dstW \\ dstH \end{bmatrix} = \begin{bmatrix} \cos\theta & -\sin\theta \\ \sin\theta & \cos\theta \end{bmatrix} \begin{bmatrix} srcW \\ srcH \end{bmatrix}.$$

The positional relationship between the target coordinate information (p, q) of the target pixel after rotation and the original coordinate information (i, j) of the original pixel before rotation may satisfy the following relationship:

$$\begin{bmatrix} p \\ q \\ 1 \end{bmatrix} = \begin{bmatrix} i \\ j \\ 1 \end{bmatrix} \begin{bmatrix} 1 & 0 & 0 \\ 0 & -1 & 0 \\ -0.5 dstW & 0.5 dstH & 1 \end{bmatrix}$$

$$\begin{bmatrix} \cos\theta & \sin\theta & 0 \\ -\sin\theta & \cos\theta & 0 \\ 0 & 0 & 1 \end{bmatrix} \begin{bmatrix} 1 & 0 & 0 \\ 0 & -1 & 0 \\ 0.5 srcW & 0.5 srcH & 1 \end{bmatrix} =$$

$$\begin{bmatrix} i \\ j \\ 1 \end{bmatrix} \begin{bmatrix} \cos\theta & -\sin\theta & 0 \\ \sin\theta & \cos\theta & 0 \\ -0.5 dstW * \cos\theta - & 0.5 dstW * \sin\theta - & 1 \\ 0.5 dstH * \sin\theta + 0.5 srcW & 0.5 dstH * \cos\theta + 0.5 srcH & \end{bmatrix}$$

Thus, the target coordinate information (p, q) may be obtained as:

p=(((2*i)−srcW)*cos Θ−((2*j)−srcH)*sin Θ+dstW)/2, and q=(((2*j)−srcH)*cos Θ−(srcW−(2*i))*sin Θ+dstH)/2;

where, i may be abscissa information of the original coordinate information (i, j), j may be ordinate information of the original coordinate information (i, j), p may be abscissa information of the target coordinate information (p, q), and q may be the ordinate information of the target coordinate information (p, q).

Referring back to FIG. 2, in S1023: Determining the position information of the target pixel according to the target coordinate information.

Referring back to FIG. 1, in S103: Filtering the original pixel to obtain an enhancement parameter value and an edge parameter value. In one embodiment, two filters with preset size may be provided to filter the original pixel. To improve the accuracy of processing the original pixel, the filters may be set to filter the pixels in an adjacent area within a preset size centered on the original pixel. In one embodiment, the two filters with preset size may include an enhancement filter and an edge detection filter, and both of them have a size of 3*3. The enhancement filter may obtain the enhancement parameter value, and the edge detection filter may obtain the edge parameter value.

In one embodiment, the area centered on the original pixel and processed by the filter may be set as the adjacent area having a size of 3*3. Referring to FIG. 7, the other pixels in the adjacent area having a size of 3*3 and centered on the original pixel (i, j) may respectively be: (i−1, j−1), (i, j−1), (i+1, j−1), (i−1, j), (i+1, j), (i−1, j+1), (i, j+1), and (i+1, j+1). The original pixel values corresponding to the above pixels may be respectively determined as f(i−1, j−1), f(i, j−1), f(i+1, j−1), f(i−1, j), f(i+1, j), f(i−1, j+1), f(i, j+1), and f(i+1, j+1). In the present disclosure, the original coordinate information (i, j) may determine the coordinate information of the original pixel, and may represent the original pixel itself.

The first filter may be set as the enhancement filter (filter 1). Parameters of the enhancement filter (filter 1) may be set as:

$$filter1 = \begin{bmatrix} -1 & 0 & -1 \\ 0 & 5 & 0 \\ -1 & 0 & -1 \end{bmatrix}.$$

The second filter may be set as the edge detection filter (filter 2). Parameters of the edge detection filter (filter 2) may be set as:

$$filter2 = \begin{bmatrix} -1 & 1 & -1 \\ 1 & 0 & 1 \\ -1 & 1 & -1 \end{bmatrix}.$$

The original pixel and eight neighboring pixels adjacent to the original pixel may be processed through the enhancement filter and the edge detection filter. The enhancement parameter value edge1 and the edge parameter value edge2 may be obtained by a calculation using a convolution method:

edge1=filter1(1,1)*f(i−1,j−1)+filter1(2,1)*f(i,j−1)+ filter1(1,3)*f(i+1,j−1)+filter1(1,2)*f(i−1,j)+filter1(2,2)*f(i,j)+filter1(2,3)*f(i+1,j)+filter1(1,3)*f(i−1,j+1)+filter(2,3)*f(i,j+1)+filter1(3,3)*f(i+1,j+1); and edge2=filter2(1,1)*f(i−1,j−1)+filter2(2,1)*f(i,j−1)+ filter2(1,3)*f(i+1,j−1)+filter2(1,2)*f(i−1,j)+filter2(2,2)*f(i,j)+filter2(2,3)*f(i+1,j)+filter2(1,3)*f(i−1,j+1)+filter2(2,3)*f(i,j+1)+filter2(3,3)*f(i+1,j+1).

The filter1 (x, y) and filter2 (x, y) in the above formulas may represent the matrix elements in the enhancement filter and the matrix elements in the edge detection filter, respectively, where x and y are integers greater than zero. For example, the filter1 (1, 1) may represent an element in the first column of the first row, that is, the matrix element '−1'. The filter1 (2, 2) may represent an element in the second column of the second row, that is, the matrix element '0'.

The enhancement filter (filter 1) and the edge detection filter (filter 2) have a size of 3*3 as an example. The enhancement filter (filter 1) and the edge detection filter (filter 2) may have other sizes, such as 5*5, 7*7, and 9*9, etc. The corresponding enhancement parameter value edge1 and the edge parameter value edge2 may be obtained by filtering the pixels in the area having a corresponding size and calculating using a convolution method. The enhancement filter (filter 1) may use a conventional finite impulse response (FIR) filter, and the edge detection filter (filter 2) may use a conventional denoising filter.

Referring back to FIG. 1, in S104: Performing a two-dimensional interpolation process according to a plurality of neighboring pixels adjacent to the original pixel, the enhancement parameter value and the edge parameter value, and obtaining the target pixel value of the target pixel corresponding to the original pixel according to the original pixel value of the original pixel, the enhancement parameter value, and the edge parameter value, thereby obtaining a target image corresponding to the rotated to-be-processed image data.

The image data may be rotated based on the tilt angle and the size information after obtaining the tilt angle and the size information. To avoid the occurrence of serrated edge or noisy points in the rotated image, the two-dimensional interpolation process may be performed according to the plurality of neighboring pixels adjacent to the original pixel, the enhancement parameter value and the edge parameter value when rotating the image data to be processed. Thus, the sharpness of the obtained target pixel may be effectively ensured, and the occurrence of serrated edge or noisy points in the rotated image may be reduced.

In one embodiment, according to the original pixel value of the original pixel, the enhancement parameter value and the edge parameter value, the target pixel value of the target pixel corresponding to the original pixel may be obtained by the following formula:

$$DST(\text{floor}(p), \text{floor}(q)) = (f(i,j) + edge1 + edge2)/2,$$

where DST(floor (p), floor (q)) may be the target pixel value, f(i, j) may be the original pixel value, the edge1 may be the enhancement parameter value, and the edge2 may be the edge parameter value. The target pixel value of the target pixel corresponding to the original pixel (i, j) may be half of the sum of the original pixel value f(i, j) of the original pixel (i, j), the enhancement parameter value and the edge parameter value.

After rotating the image data by performing the two-dimensional interpolation process according to the plurality of neighboring pixels adjacent to the original pixel, the enhancement parameter value and the edge parameter value, the occurrence of serrated edge or noisy points in the rotated image may be avoided. Thus, the sharpness of the outputted target image may be ensured, and the practicability of the method for image rotation may be effectively ensured.

Figure 4:
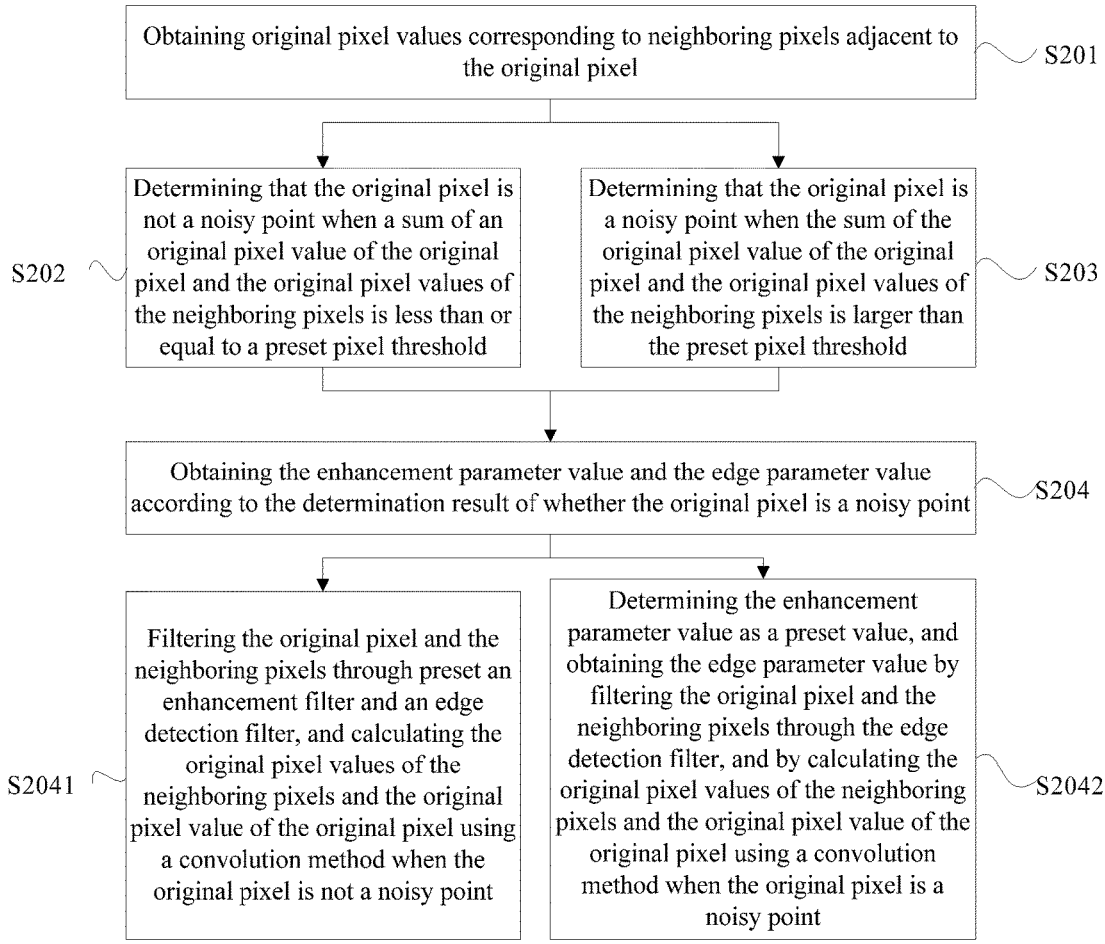
FIG. 4 illustrates a flow chart of another exemplary method for image rotation consistent with various disclosed embodiments of the present disclosure.

FIG. 4 illustrates a flow chart of another exemplary method for image rotation consistent with various disclosed embodiments. Referring to FIGS. 1-4 and 6-7, after filtering the original pixel, the method for image rotation may include the following.

In S201: Obtaining the original pixel values corresponding to the neighboring pixels adjacent to the original pixel.

In S202: Determining that the original pixel is not a noisy point (also referred to as an unnoisy point) when the sum of the original pixel value of the original pixel and the original pixel values of the neighboring pixels is less than or equal to a preset pixel threshold.

In S203: Determining that the original pixel is a noisy point when the sum of the original pixel value of the original pixel and the original pixel values of the neighboring pixels is larger than the preset pixel threshold.

The area adjacent to the original pixel has a size of 3*3 as an example. The 3*3 adjacent area may include one original pixel and eight neighboring pixels adjacent to the original pixel, and the original pixel values of the eight neighboring pixels may be obtained. The sum of total original pixel values 'tmp_sum' may be obtained by summing the original pixel value of the original pixel and the original pixel values of the eight neighboring pixels:

$$tmp\_sum = f(i-1, j-1) + f(i, j-1) + f(i+1, j-1) + f(i-1, j) + f(i, j) + f(i+1, j) + f(i-1, j+1) + f(i, j+1) + f(i+1, j+1).$$

The sum of the total original pixel values 'tmp_sum' may be compared with the preset pixel threshold. When the sum of the total original pixel values 'tmp_sum' is greater than the preset pixel threshold, the original pixel may be a noisy point. When the sum of the total original pixel values 'tmp_sum' is less than or equal to the preset pixel threshold, the original pixel may be an unnoisy point. The preset pixel threshold may be pre-determined by those skilled in the art according to specific design requirements within a specific numerical range. In one embodiment, the preset pixel threshold may be 255*6.

In S204: Obtaining the enhancement parameter value and the edge parameter value according to the determination result of whether the original pixel is a noisy point. In one embodiment, obtaining the enhancement parameter value and the edge parameter value according to the determination result of whether the original pixel is a noisy point may include the following.

In S2041: Obtaining the enhancement parameter value by filtering the original pixel and neighboring pixels through the enhancement filter that are preset, and by calculating the original pixel values of neighboring pixels and the original pixel value of the original pixel using a convolution method, and obtaining the edge parameter value by filtering the original pixel and the neighboring pixels through edge detection filter that are preset, and by calculating the original pixel values of the neighboring pixels and the original pixel value of the original pixel using a convolution method, when the original pixel is an unnoisy point. After determining that the original pixel is an unnoisy point, the enhancement parameter value and the edge parameter value may be obtained through the enhancement filter and edge detection filter that are preset. The specific implementation process and the implementation effect may be similar with or the same as that associated with S103 in FIG. 1.

In S2042: Determining the enhancement parameter value as a preset value and obtaining the edge parameter value by filtering the original pixel and the neighboring pixels through the edge detection filter, and by calculating the original pixel values of the neighboring pixels and the original pixel value of the original pixel using a convolution method when the original pixel is a noisy point. After determining that the original pixel is a noisy point, the enhancement parameter value may be determined as a preset value. The preset value may be pre-determined by those skilled in the art according to specific design requirements and may not be limited to a specific numerical range. In one embodiment, the preset value may be 255. The 255 may represent the pixel value of the white pixel. Therefore, the original pixel as the noisy point may be suppressed after being rotated, and a clearer target image may be outputted. The edge parameter value may be obtained by the preset edge detection filter. The specific implementation process and the implementation effect may be similar with or the same as that associated with S103 in FIG. 1.

Figure 5:
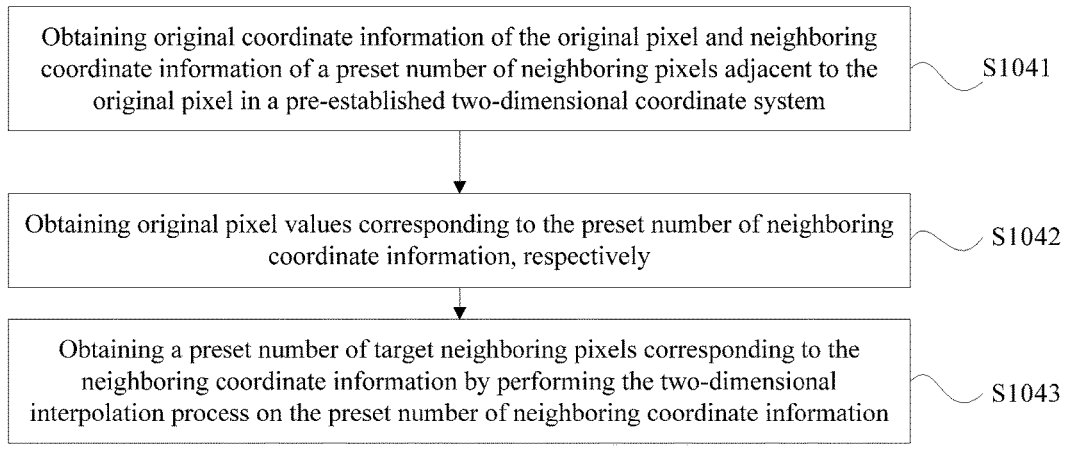
FIG. 5 illustrates a flow chart for an exemplary process for obtaining a target pixel value of a target pixel consistent with various disclosed embodiments of the present disclosure.
Figure 9:
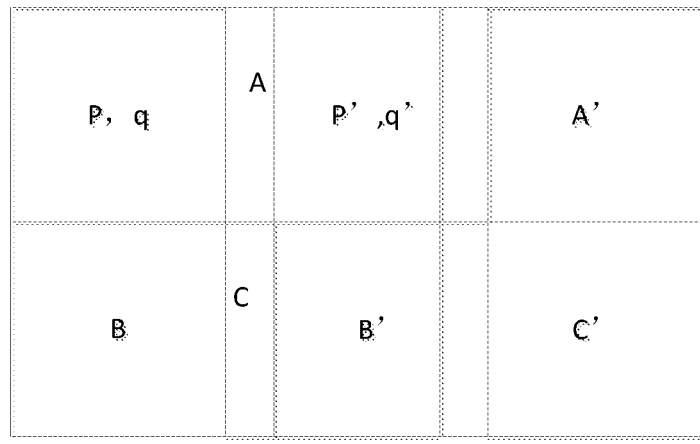
FIG. 9 illustrates a schematic diagram of an exemplary target pixel consistent with various disclosed embodiments of the present disclosure.

FIG. 5 illustrates a flow chart for an exemplary process for performing the two-dimensional interpolation process according to the plurality of neighboring pixels adjacent to the original pixel, the enhancement parameter value and the edge parameter value, and obtaining a target pixel value of a target pixel corresponding to the original pixel based on the original pixel value of the original pixel, the enhancement parameter value and the edge parameter value consistent with various disclosed embodiments. FIG. 8 illustrates a schematic diagram of original pixel consistent with various disclosed embodiments. FIG. 9 illustrates a schematic diagram of a target pixel consistent with various disclosed embodiments. Referring to FIGS. 1-9, performing the two-dimensional interpolation process according to the plurality of neighboring pixels adjacent to the original pixel, the enhancement parameter value and the edge parameter value, and obtaining the target pixel value of the target pixel corresponding to the original pixel based on the original pixel value of the original pixel, the enhancement parameter value and the edge parameter value may include the following.

In S1041: Obtaining original coordinate information of the original pixel and the neighboring coordinate information of a preset number of neighboring pixels adjacent to the original pixel in the pre-established two-dimensional coordinate system.

The two-dimensional coordinate system may be established by a manner that is the same as the two-dimensional coordinate system as disclosed herein. A specific numerical range of the preset number of neighboring pixels is not limited and may be set by those skilled in the art according to specific design requirements. For example, the preset number of neighboring pixels may be three, four, or five, etc.

In S1042: Obtaining the original pixel values corresponding to the preset number of neighboring coordinate information, respectively.

In S1043: Obtaining a preset number of the target neighboring pixels corresponding to neighboring coordinate information by performing the two-dimensional interpolation process on the preset number of neighboring coordinate information.

The target pixel value of each target neighboring pixel may be half of the sum of the original pixel value of the corresponding neighboring coordinate information, the enhancement parameter value and the edge parameter value.

The target pixel value of the target pixel corresponding to the original pixel may be half of the sum of the original pixel value of the original pixel, the enhancement parameter value and the edge parameter value.

FIG. 8 illustrates a schematic to better understand the two-dimensional interpolation process. The two-dimensional interpolation process may be performed on three pixels including a neighboring pixel (i+1, j) adjacent to the original pixel point (i, j) in the x direction, a neighboring pixel (i, j+1) adjacent to the original pixel point (i, j) in the y direction, and a neighboring pixel (i+1, j+1) adjacent to the original pixel point (i, j) in the oblique direction. In other words, the two-dimensional interpolation process may be performed on the three neighboring coordinate information (i+1, j), (i, j+1), (i+1, j+1), and the original pixel values of the three neighboring pixels may be f (i+1, j), f (i, j+1) and f (i+1, j+1), respectively. Three target neighboring pixels may be obtained after performing the two-dimensional interpolation process. The target pixel values of the three target neighboring pixels may respectively be the following:

$$DST(\text{floor}(p+\text{abs}(\sin \Theta)), \text{floor}(q)) = (f(i+1, j) + \text{edge1} + \text{edge2})/2,$$

$$DST(\text{floor}(p), \text{floor}(q+\text{abs}(\sin \Theta))) = (f(i, j+1) + \text{edge1} + \text{edge2})/2, \text{ and}$$

$$DST(\text{floor}(p+\text{abs}(\sin \Theta)), \text{floor}(q+\text{abs}(\sin \Theta))) = (f(i+1, j+1) + \text{edge1} + \text{edge2})/2;$$

the target pixel value of the target pixel corresponding to the original pixel may satisfy:

$$DST(\text{floor}(p), \text{floor}(q)) = (f(i, j) + \text{edge1} + \text{edge2})/2,$$

where 'abs' may represent the absolute value, 'floor' may represent the rounding, 'edge1' may be the enhancement parameter value, 'edge2' may be the edge parameter value, '$\Theta$' may be the tilt angle, f(i, j) may be the original pixel value corresponding to the original coordinate information (i, j), and DST (floor (p), floor (q)) may be the target pixel value of the target pixel corresponding to the original pixel (i, j).

The target pixel value of the target pixel corresponding to the rotated original pixel: DST (floor (p), floor (q)), and the target pixel values of the three target neighboring pixels obtained after performing the two-dimensional interpolation process: DST(floor(p+abs(sin $\Theta$)), floor(q)), DST(floor(p), floor(q+abs(sin $\Theta$))), and DST(floor(p+abs(sin $\Theta$)), floor(q+abs(sin $\Theta$))), may be the target pixel values of the target image obtained after rotating the image data to be processed. Similarly, each original pixel in the image data to be processed may be processed as described above, thus the target image after rotating the image data to be processed may be obtained.

In addition, when the original pixel is a noisy point, the enhancement parameter value 'edge1' may be equal to 255 instead of the value obtained by the enhancement filter (filter1) through a filtering process using a convolution method. Therefore, the target pixel value of the target pixel corresponding to the rotated original pixel as the noisy point: DST (floor (p), floor (q)) (f (i, j)+edge1+edge2)/2, and the target pixel values of the three interpolated neighboring pixels: DST(floor(p+abs(sin $\Theta$)), floor(q)), DST(floor(p), floor(q+abs(sin $\Theta$))), and DST(floor(p+abs(sin $\Theta$)), floor(q+abs(sin $\Theta$))), may tend to 255, where 255 may represent the pixel value of the white pixel. Therefore, the original pixel as the noisy point may be suppressed after being rotated, and a clearer target image may be outputted.

When the original pixel (i, j) of the image data to be processed is a boundary pixel, in other words, when i=1 or j=1, the target pixel value of the target pixel corresponding to the rotated original pixel may be: DST(floor(p+0.5), floor(q+0.5))=f(i, j). In other words, the boundary pixel may move to the right after being rotated, and the original pixel value may be the same as the corresponding target pixel value. When the original pixel (i, j) of the image data to be processed is a boundary pixel, in other words, when i=srcW or j=srcH, the target pixel value of the target pixel corresponding to the rotated original pixel may be: DST(floor (p),floor(q))=0. Among them, i∈[1, srcW], j∈[1, srcH], p∈[1, dstW], and q∈[1, dstH], where i, j, p, and q are integers.

For one original pixel (i, j), the three target neighboring pixels of the target image corresponding to the original pixel may be repeatedly replaced by one of another following original pixel (i+1, j) and corresponding three target neighboring pixels. Referring to FIGS. 8-9, the target pixel (p, q) and the three interpolated target neighboring pixels A, B, and C may be outputted after rotating the first original pixel (i, j) and performing the two-dimensional interpolation process. The target pixel values of the target neighboring pixels A, B, and C may respectively be: DST(floor (p+abs (sin Θ)), floor (q)), DST(floor (p), floor (q+abs (sin Θ))), and DST (floor (p+abs (sin Θ)), floor (q+abs (sin Θ))).

The target pixel (p', q') and the three interpolated target neighboring pixels A', B', and C' may be outputted after rotating a second original pixel (i+1, j) and performing the two-dimensional interpolation process. The target pixel (p', q') may cover the target neighboring pixel A, and the target neighboring pixel B' may cover the target neighboring pixel C. In this case, the target image may be based on the ultimately outputted target pixels and target pixel values.

The occurrence of serrated edge in the rotated image may be effectively avoided through the two-dimensional interpolation process in the disclosed method for image rotation. At the same time, the image data may be filtered and denoised, such that the noisy points in the rotated image may be reduced, the outputted target image may be more clearly, and the stability and reliability of the method for image rotation may be effectively improved.

Figure 10:
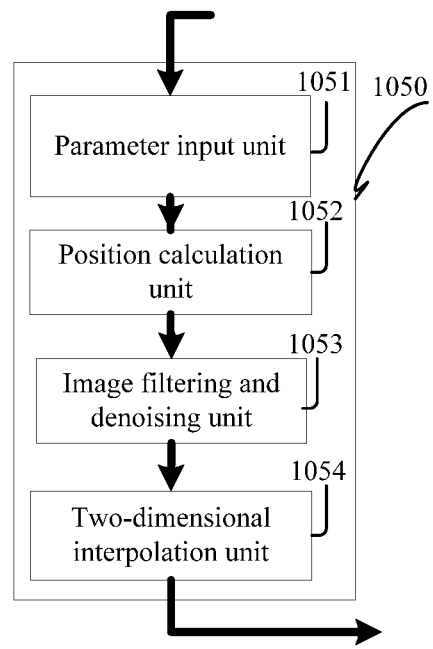
FIG. 10 illustrates an exemplary device for image rotation consistent with various disclosed embodiments of the present disclosure.

FIG. 10 illustrates a schematic diagram of a device for image rotation consistent with various disclosed embodiments. Referring to FIG. 10, an exemplary image rotation device 1050 may be provided to rotate the image data. In one embodiment, the image rotation device 1050 may include a parameter input unit 1051, a position calculation unit 1052, an image filtering and denoising unit 1053, and a two-dimensional interpolation unit 1054.

The parameter input unit 1051 may obtain the tilt angle and size information of the image data to be processed. The position calculation unit 1052 may obtain the position information of the target pixel corresponding to each rotated original pixel by a calculation based on the tilt angle, the size information and the position information of each original pixel. In one embodiment, the position calculation unit 1052 may obtain the original coordinate information of the original pixel in the pre-established two-dimensional coordinate system, and may obtain the target coordinate information corresponding to the rotated original coordinate information based on the original coordinate information, the tilt angle and the size information. The size information may include height information and width information of the image data. In addition, the position calculation unit 1052 may obtain height information and width information of the target image based on the tilt angle, the height information and the width information of the image data. Moreover, the position calculation unit 1052 may determine the target coordinate information based on the original coordinate information, the tilt angle, the height information and the width information of the image data, and the height information and the width information of the target image. Further, the position calculation unit 1052 may determine the position information of the target pixel based on the target coordinate information.

The position calculation unit 1052 may determine the target coordinate information based on the following formulas:

$$p=(((2*i)-srcW)*\cos\Theta-((2*j)-srcH)*\sin\Theta+dstW)/2,$$
and
$$q=(((2*j)-srcH)*\cos\Theta-(srcW-(2*i))*\sin\Theta+dstH)/2,$$

where 'i' may be abscissa information of the original coordinate information (i, j), 'j' may be ordinate information of the original coordinate information (i, j), 'p' may be abscissa information of the target coordinate information (p, q), 'q' may be ordinate information of the target coordinate information (p, q), srcW' may be the width information of the image data, srcH' may be the height information of the image data, 'Θ' may be the tilt angle, dstW' may be the width information of the target image, and 'dstH' may be the height information of the target image.

The image filtering and denoising unit 1053 may filter the original pixel to obtain the enhancement parameter value and the edge parameter value. The two-dimensional interpolation unit 1054 may obtain the target image corresponding to rotated image data to be processed by performing a two-dimensional interpolation process according to a plurality of neighboring pixels adjacent to the original pixel, the enhancement parameter value and the edge parameter value, and by obtaining the target pixel value of the target pixel corresponding to the original pixel according to the original pixel value of the original pixel, the enhancement parameter value, and the edge parameter value.

Further, the two-dimensional interpolation unit 1054 may obtain the target pixel value of the target pixel corresponding to the original pixel based on the following formula:

$$DST(\text{floor}(p),\text{floor}(q))=(f(i,j)+edge1+edge2)/2,$$

where DST (floor (p), floor (q)) may be the target pixel value of the target pixel, f (i, j) may be the original pixel value, 'edge1' may be the enhancement parameter value, and 'edge2' may be the edge parameter value.

The specific shape and structure of the parameter input unit 1051, the position calculation unit 1052, the image filtering and denoising unit 1053, and the two-dimensional interpolation unit 1054 in the present disclosure are not limited, may be set by those skilled in the art according to implemented specific functions, and are not repeated herein. In one embodiment, the parameter input unit 1051, the position calculation unit 1052, the image filtering and denoising unit 1053, and the two-dimensional interpolation unit 1054 may be integrated into one to form the image rotation device 1050. In addition, the specific implementation process and the implementation effect implemented by the parameter input unit 1051 and the position calculation unit 1052 may be similar with or the same as that associated with S101-S104 in FIG. 1, S1021-S1023 in FIG. 2, and S10221-S10222 in FIG. 3.

The occurrence of serrated edge in the rotated image may be avoided by providing the two-dimensional interpolation unit 1054 in the image rotation device 1050 consistent with various disclosed embodiments. Thus, the sharpness of the outputted target image may be ensured, and the practicability of the device for image rotation may be effectively ensured.

Referring to FIG. 10, the image filtering and denoising unit 1053 may obtain original pixel values corresponding to the neighboring pixels adjacent to the original pixel after filtering the original pixel. In one embodiment, when the sum of the original pixel value of the original pixel and the original pixel values of the neighboring pixels is less than or equal to the preset pixel threshold, the original pixel may be determined to be an unnoisy point. In another embodiment, when the sum of the original pixel value of the original pixel and the original pixel values of the neighboring pixels is greater than the preset pixel threshold, the original pixel may be determined to be a noisy point. The enhancement parameter value and the edge parameter value may be obtained according to the determination result of whether the original pixel is a noisy point.

In one embodiment, when the original pixel is an unnoisy point, the image filtering and denoising unit 1053 may obtain the enhancement parameter value and the edge parameter value by filtering the original pixel and the neighboring pixels through the enhancement filter and edge detection filter that are preset respectively, and by calculating the original pixel values of the neighboring pixels and the original pixel value of the original pixel using a convolution method.

In another embodiment, when the original pixel is a noisy point, the enhancement parameter value may be determined as a preset value and the edge parameter value may be obtained by filtering the original pixel and the neighboring pixels through the edge detection filter, and by calculating the original pixel values of the neighboring pixels and the original pixel value of the original pixel using a convolution method.

The specific implementation process and the implementation effect implemented by the image filtering and denoising unit 1053 may be similar with or the same as that associated with S201-S204 and S2041-S2042 in FIG. 4.

Referring to FIG. 10, the two-dimensional interpolation unit 1054 may obtain original coordinate information of the original pixel and the neighboring coordinate information of a preset number of neighboring pixels adjacent to the original pixel in the pre-established two-dimensional coordinate system. In addition, the two-dimensional interpolation unit 1054 may obtain the original pixel values corresponding to the preset number of neighboring coordinate information, respectively. Further, the two-dimensional interpolation unit 1054 may obtain a preset number of the target neighboring pixels corresponding to neighboring coordinate information by performing the two-dimensional interpolation process on the preset number of neighboring coordinate information. The target pixel value of each target neighboring pixel may be half of the sum of the original pixel value of the corresponding neighboring coordinate information, the enhancement parameter value and the edge parameter value.

The target pixel value of the target pixel corresponding to the original pixel may be half of the sum of the original pixel value of the original pixel, the enhancement parameter value and the edge parameter value.

In one embodiment, the two-dimensional interpolation unit 1054 may obtain three target neighboring pixels by performing the two-dimensional interpolation process on three neighboring coordinate information (i+1, j), (i, j+1), (i+1, j+1). The target pixel values of the three target neighboring pixels corresponding to the three neighboring coordinate information may be respectively obtained by the following formulas:

$$DST(\text{floor}(p+\text{abs}(\sin \Theta)), \text{floor}(q)) = (f(i+1,j) + \text{edge1} + \text{edge2})/2,$$

$$DST(\text{floor}(p), \text{floor}(q+\text{abs}(\sin \Theta))) = (f(i,j+1) + \text{edge1} + \text{edge2})/2, \text{ and}$$

$$DST(\text{floor}(p+\text{abs}(\sin \Theta)), \text{floor}(q+\text{abs}(\sin \Theta))) = (f(i+1, j+1) + \text{edge1} + \text{edge2})/2.$$

The target pixel value of the target pixel corresponding to the original pixel may satisfy:

$$DST(\text{floor}(p), \text{floor}(q)) = (f(i,j) + \text{edge1} + \text{edge2})/2.$$

The specific implementation process and the implementation effect implemented by the two-dimensional interpolation unit 1054 may be similar with or the same as that associated with S1041-S1043 in FIG. 5.

In another embodiment, the device for image rotation may include a memory storing program instructions for a method for image rotation, and one or more processors coupled to the memory. When executing the program instructions, the one or more processors may be configured for obtaining a tilt angle and size information of a to-be-processed image data. The one or more processors may be also configured for obtaining position information of a target pixel corresponding to each rotated original pixel by performing a calculation based on the tilt angle and the size information of the to-be-processed image data and position information of each original pixel. In addition, the one or more processors may be configured for obtaining an enhancement parameter value and an edge parameter value by filtering the original pixel. Further, the one or more processors may be configured for obtaining a target image corresponding to rotated to-be-processed image data, by performing a two-dimensional interpolation process based on a plurality of neighboring pixels of the original pixel, the enhancement parameter value, and the edge parameter value, and by obtaining a target pixel value of the target pixel corresponding to the original pixel according to an original pixel value of the original pixel, the enhancement parameter value, and the edge parameter value.

The occurrence of serrated edge in the rotated image may be avoided by the two-dimensional interpolation process implemented by the two-dimensional interpolation unit 1054 in FIG. 10. At the same time, the image data may be filtered and denoised, such that the noisy points in the rotated image may be reduced, the outputted target image may be clearer, and the stability and reliability of the device for image rotation may be effectively improved, facilitating market promotion and application.

Figure 11:
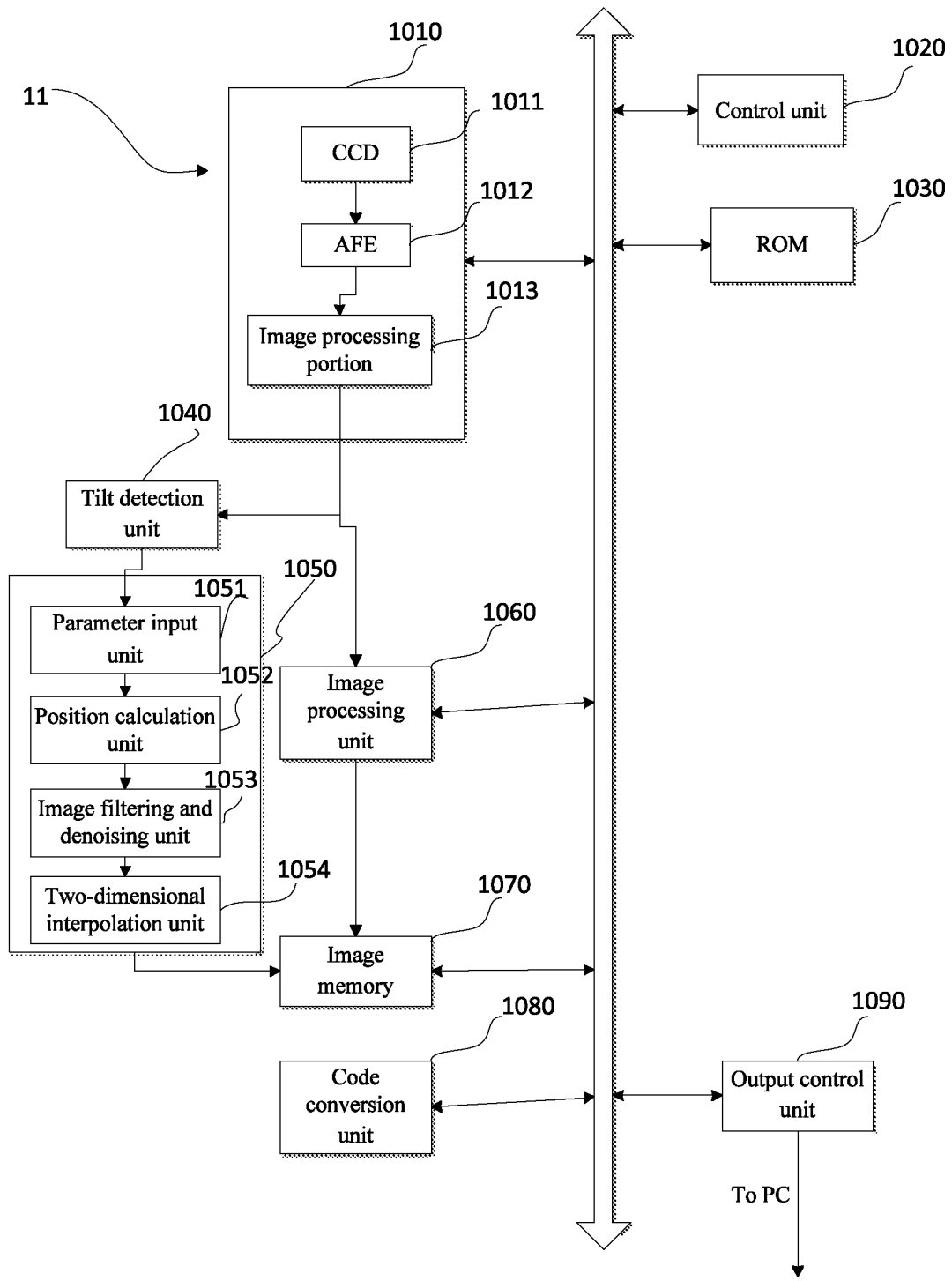
FIG. 11 illustrates an exemplary apparatus for image formation consistent with various disclosed embodiments of the present disclosure.

FIG. 11 illustrates a schematic diagram of an apparatus for image formation consistent with various disclosed embodiments. Referring to FIG. 11, an exemplary image formation apparatus 11 provided in the present disclosure may include the image rotation device 1050 in FIG. 10.

The specific shape and structure of the image formation apparatus 11 are not limited, and may be set by those skilled in the art according to specific design requirements. For example, the image formation apparatus 11 may include a printing apparatus, an image scanning apparatus, a copying apparatus, and a fax apparatus, etc. When the image formation apparatus 11 needs to rotate the image, the method and device for image rotation in FIG. 1 and FIG. 10 may be suitable for the image rotation processing of the printing apparatus, the copying apparatus, and the fax apparatus.

The image formation apparatus 11 may include a control unit 1020, a ROM 1030, a scanning unit 1010, a tilt detection unit 1040, an image processing unit 1060, an image memory 1070, a code conversion unit 1080, and an output control unit 1090. The control unit 1020 may include a CPU, and may be connected with the scanning unit 1010, the tilt detection unit 1040, the image rotation device 1050, the image processing unit 1060, the image memory 1070, the code conversion unit 1080, and the output control unit 1090. The ROM 1030 may pre-store control logic/commands for controlling the image formation apparatus 11 to operate. The control unit 1020 may control the above-described units to execute the corresponding functions and operations according to the control logic/commands by reading the control logic/commands in the ROM 1030. The ROM 1030 and the image memory 1070 may be a part of the storage unit of the image formation apparatus 11. The storage unit of the image formation apparatus 11 may be divided into a plurality of sections to be allocated to the respective units for use in storing the operation parameters or programs of the respective units.

After the scanning unit 1010 scans the original document and obtains the image data to be processed, the image data to be processed may be subjected to known image processing (e.g., filtering processing) in the image processing unit 1060 and then may be inputted and stored into the image memory 1070. The image memory 1070 may store the image data read by the scanning unit 1010, thereby facilitating the user's calling and viewing of the image data.

When viewing the image data and the corresponding output status, the image formation apparatus 11 may be connected to a personal computer (PC). In this case, the output control unit 1090 may send the coded image data to the personal computer (PC) as a host device. The transmission method is not limited, and may include a local area network (LAN) method, and a universal serial bus (USB) method, etc. Thus, the corresponding image data information and the corresponding output status may be viewed through the personal computer. The practicality of the image formation apparatus 11 may be further improved.

The image processing unit 1060, the tilt detection unit 1040, the image rotation device 1050, and the code conversion unit 1080 in the disclosed embodiments may be implemented by using hardware, such as ASIC, and FPGA, etc. In one embodiment, the rotation processing function of the image rotation device 1050 may be realized by inputting an image processing program for rotating an image using the above-described method into the ASIC. In another embodiment, the image rotation device 1050 may be implemented by a combination of a CPU and a program.

Referring to FIG. 11, the specific structure of the scanning unit 1010 in the present disclosure is not limited. In one embodiment, the scanning unit 1010 may include an image reader 1011, and an analog front end 1012. The image reader 1011 may scan the original image to be processed according to a preset scanning strategy. The analog front end 1012 may convert the acquired original image information by scanning into the image data to be processed.

The specific shape and structure of the image reader 1011 and the analog front end 1012 in the present disclosure are not limited, and may be set by those skilled in the art according to specific design requirements. In one embodiment, the image reader 1011 may include a charge coupled device (CCD), or a contact image sensor (CIS), etc. The analog front end 1012 may include an AFE. In one embodiment, the image reader 1011 may include a CCD, such that RGB colors line sensors of the CCD may scan the image data when reading the original document, and the signal on each line sensor may be converted from an analog signal to a digital signal by the above AFE. Therefore, one row of the pixel data may be outputted from the AFE as tone values of RGB colors through the main scan.

In one embodiment, the scanning unit 1010 may also include an image processing portion 1013. The image processing portion 1013 may preliminarily correct the image data after converting the acquired original image information by scanning into the image data to be processed, and may output the preliminarily corrected image data.

The specific implementation process for performing preliminary correction on the image data by the image processing portion 1013 is not limited and may be set by those skilled in the art according to specific design requirements.

In one embodiment, the image processing portion 1013 may perform a shading correction process and a chromatic aberration correction on the image data.

The image processing portion 1013 may perform the shading correction process on each row of data in the image data. When scanning the image data, uneven reading may easily occur due to the optical system of the scanning device. Thus, to ensure the sharpness of the outputted image data, the shading correction process may need to be performed on the image data. The specific correction process may include conventional correction methods.

In addition, when obtaining the image data by scanning, the spacing between each color sensor on the scanning device (row spacing) may easily cause chromatic aberration of the image data. Thus, to ensure the matching degree of the outputted image data, the chromatic aberration correction may need to be performed on the image data. The specific correction process may include conventional correction methods.

The specific shape and structure of the image processing portion 1013 in the present disclosure are not limited, and may be set by those skilled in the art according to specific design requirements. Through the preliminary correction process performed on the image data by the image processing portion 1013, the sharpness of the image data may be effectively improved, and accuracy and reliability of analysis processing performed on the image data may be further improved.

The tilt detection unit 1040 may detect the original document area by analyzing the image data inputted from the scanning unit 1010, and may automatically detect the tilt of the original document (the tilt angle to be rotated to correct the tilt) based on the original document area. The tilt detection unit 1040 may store the detected tilt angle and the width and height of the image data in suitable positions in the storage unit. The tilt angle and the width and height of the image data as correction parameters may be inputted into the image rotation device 1050. The tilt detection unit 1040 may input a rotation angle inputted by a user on a panel (not illustrated) of the image formation apparatus 11 as the correction parameter into the image rotation device 1050. In another embodiment, the tilt detection unit 1040 may be integrated into the image rotation device 1050.

To further improve the sharpness of the outputted target image, the image formation apparatus 11 may include the image processing unit 1060. The image processing unit 1060 may perform a secondary processing on the image data according to a preset processing strategy after outputting the preliminarily corrected image data.

In the present disclosure, after outputting the preliminarily corrected image data, to further improve the sharpness of the image data, a secondary processing may be performed on the image data according to a preset processing strategy. The processing strategy may be pre-determined, and may be set by those skilled in the art according to specific design requirements. In one embodiment, the processing strategy may include known image processing (e.g., filtering processing) for further improving the sharpness of the image data, and is not repeated herein.

The image memory 1070 may store the image data after performing the secondary processing. The output control unit 1090 may output the target image after rotating the image data to be processed to external devices.

In addition, when the number of image data to be processed is large, to facilitate storing and transferring the image data, the stored image data may be compressed and encoded according to a preset encoding strategy by the code conversion unit 1080. Therefore, when outputting the image data, the outputted image data may be identified according to the image code, the accuracy and reliability of the outputted image data may be ensured, and the practicability of the image formation apparatus 11 may be further improved.

Since the image rotation device 1050 in FIG. 10 starts the image rotation processing to obtain the width and the height of an entire original image, the image memory 1070 may need to store a full page of original image data to start the operation. The image data outputted from the scanning unit 1010 may generally have a unit of band, and one band of the image data may be the multi-row image data scanned by the image reader 1011. The disclosed embodiments may perform the tilt correction processing on the image data having a size of one band. When the image memory 1070 stores the image data having a size of one band outputted from the scanning unit 1010, the image rotation device 1050 may start to perform the tilt correction on the image data in the image memory 1070, and thus the storage capacity of the image memory 1070 may be reduced. In one embodiment, the scanning unit 1010 may output the image data having a size of one band. The tilt detection unit 1040 may perform the tilt detection on the image data having a size of one band, and may input the width, height, and tilt angle of the image data having a size of one band into the image rotation device 1050. The image rotation device 1050 may rotate the image data having a size of one band. The above-described processing manner may be repeated until the one full page of the image data obtained by the scanning unit 1010 is processed. When the scanning unit 1010 outputs the image data having a size of one band, the image rotation device 1050 may perform the tilt correction processing based on the width, height, and tilt angle of the image data having a size of one band. Therefore, the tilt correction processing may be performed while scanning the image data, such that not only the storage capacity of the image memory 1070 may be reduced, but also the image processing speed may be improved. For the inputted first band of the image data, the tilt angle may need to be determined, and in various embodiments only the width and height of one band of the image data may need to be inputted into the correction process performed on the following band of the image data.

In another embodiment, the apparatus for image formation may include a memory storing program instructions for a method for image formation, and one or more processors coupled to the memory. When executing the program instructions, the one or more processors may be configured for obtaining a to-be-processed image data by scanning an original document or receiving from external, and detecting a tilt angle and size information of the to-be-processed image data, used for image rotation.

Further, the one or more processors may be configured for performing the image rotation includes: obtaining the tilt angle and the size information of the to-be-processed image data, obtaining position information of a target pixel corresponding to each rotated original pixel by performing a calculation based on the tilt angle and the size information of the to-be-processed image data and position information of each original pixel, obtaining an enhancement parameter value and an edge parameter value by filtering the original pixel. Moreover, the one or more processors may be configured for performing a two-dimensional interpolation process based on a plurality of neighboring pixels of the original pixel, the enhancement parameter value, and the edge parameter value, and obtaining a target pixel value of the target pixel corresponding to the original pixel according to an original pixel value of the original pixel, the enhancement parameter value, and the edge parameter value, thereby obtaining a target image corresponding to the rotated to-be-processed image data.

In another embodiment, the one or more processors may be further configured for: obtaining original coordinate information of the original pixel in a pre-established two-dimensional coordinate system; obtaining height information and width information of the target image according to the tilt angle, height information and width information of the to-be-processed image data; determining target coordinate information according to the original coordinate information, the tilt angle, the height information and the width information of the to-be-processed image data, and the height information and the width information of the target image; and determining the position information of the target pixel according to the target coordinate information.

In another embodiment, the one or more processors may be further configured for obtaining original pixel values corresponding to neighboring pixels of the original pixel. When a sum of an original pixel value of the original pixel and the original pixel values of the neighboring pixels is less than or equal to a preset pixel threshold, the original pixel may be an unnoisy point. When the sum of the original pixel value of the original pixel and the original pixel values of the neighboring pixels is larger than the preset pixel threshold, the original pixel may be a noisy point. The one or more processors may be further configured for obtaining the enhancement parameter value and the edge parameter value according to a determination result of whether the original pixel is a noisy point.

In another embodiment, the one or more processors may be further configured for obtaining the enhancement parameter value and the edge parameter value by filtering the original pixel and the neighboring pixels through an enhancement filter and an edge detection filter that are preset independently, and calculating the original pixel values of the neighboring pixels and the original pixel value of the original pixel using a convolution method when the original pixel is an unnoisy point. In certain embodiments, the one or more processors may be further configured for determining the enhancement parameter value as a preset value, and obtaining the edge parameter value by filtering the original pixel and the neighboring pixels through the edge detection filter, and by calculating the original pixel values of the neighboring pixels and the original pixel value of the original pixel using a convolution method when the original pixel is a noisy point.

In another embodiment, the one or more processors may be further configured for: obtaining original coordinate information of the original pixel and neighboring coordinate information of a preset number of neighboring pixels of the original pixel in a pre-established two-dimensional coordinate system; obtaining original pixel values corresponding to the preset number of neighboring coordinate information, respectively; and obtaining a preset number of target neighboring pixels corresponding to the neighboring coordinate information by performing the two-dimensional interpolation process on the preset number of neighboring coordinate information. The target pixel value of each target neighboring pixel may be half of a sum of the original pixel value of the corresponding neighboring coordinate information, the enhancement parameter value and the edge parameter value. The target pixel value of the target pixel corresponding to the original pixel may be half of a sum of the original pixel value of the original pixel, the enhancement parameter value and the edge parameter value.

In another embodiment, the one or more processors may be further configured for obtaining three target neighboring pixels by performing the two-dimensional interpolation process on three neighboring coordinate information. The original coordinate information of the original pixel may be (i, j), and the three neighboring coordinate information may be (i+1, j), (i, j+1), (i+1, j+1), respectively. The one or more processors may be further configured for obtaining target pixel values of the three target neighboring pixels using following formulas:

$$DST(\text{floor}(p+\text{abs}(\sin \Theta)), \text{floor}(q))=(f(i+1,j)+\text{edge}1+\text{edge}2)/2,$$

$$DST(\text{floor}(p), \text{floor}(q+\text{abs}(\sin \Theta)))=(f(i,j+1)+\text{edge}1+\text{edge}2)/2, \text{ and}$$

$$DST(\text{floor}(p+\text{abs}(\sin \Theta)), \text{floor}(q+\text{abs}(\sin \Theta)))=(f(i+1,j+1)+\text{edge}1+\text{edge}2)/2.$$

The one or more processors may be further configured for obtaining the target pixel value of the target pixel corresponding to the original pixel using following formula:

$$DST(\text{floor}(p), \text{floor}(q))=(f(i,j)+\text{edge}1+\text{edge}2)/2,$$

where 'abs' may represent an absolute value, 'floor' may represent rounding, 'edge1' may be the enhancement parameter value, 'edge2' may be the edge parameter value, '$\Theta$' may be the tilt angle, f(i, j) may be the original pixel value corresponding to the original coordinate information (i, j), DST (floor (p), floor (q)) may be the target pixel value of the target pixel corresponding to the original pixel (i, j), f (i+1, j) may be the original pixel value corresponding to the neighboring coordinate information (i+1, j), f (i, j+1) may be the original pixel value corresponding to the neighboring coordinate information (i, j+1), f (i+1, j+1) may be the original pixel value corresponding to the neighboring coordinate information (i+1, j+1), DST(floor(p+abs(sin $\Theta$)), floor(q)), DST(floor(p), floor(q+abs(sin $\Theta$))), and DST(floor (p+abs(sin $\Theta$)), floor(q+abs(sin $\Theta$))) may be the target pixel values of the three target neighboring pixels corresponding to the three neighboring coordinate information (i+1, j), (i, j+1), (i+1, j+1), respectively.

The image formation apparatus 11 in the present disclosure may effectively rotate the image through the image rotation device 1050, and may avoid the occurrence of serrated edge in the rotated image. Thus, the sharpness of the outputted target image may be ensured, and the practicability of the image formation apparatus 11 may be effectively ensured.

The method and device for image rotation and the apparatus for image formation in the present disclosure may perform the two-dimensional interpolation process according to a plurality of neighboring pixels adjacent to the original pixel, the enhancement parameter value and the edge parameter value. Therefore, the occurrence of serrated edge in the rotated image may be effectively avoided, the sharpness of the outputted target image may be ensured, and the practicability of the method for image rotation may be effectively ensured.

The devices and methods described in the present disclosure may be realized through other approaches. That is, the description on the methods and devices in the present disclosure may only be examples for illustration purposes. For instance, the units may be merely defined based on their logical functions, and in actual applications, the units may be defined based on other criteria. For example, multiple units or components may be combined together or be integrated into another system, or some features may be ignored or may not be executed. Moreover, the coupling between the units, and components illustrated or discussed above may be direct coupling or communication connections through some indirect coupling or communication connections between interfaces, devices, or units. The coupling may be electrical, mechanical, or in any other appropriate form.

The units described separately above, may or may not be physically separated. Each component illustrated and discussed above as a unit may or may not be a physical unit. That is, the component may be located at a certain position, or may be distributed to multiple network units. Moreover, based on the needs of actual applications, all or a part of the units may be used to realize the methods consistent with disclosed embodiments.

Further, various functional units discussed in the disclosed embodiments may be integrated in a single processing unit or may be physically independent from each other. In addition, a plurality of units formed by integrating two or more than two functional units together may further form a processing unit. The integrated units described above may be realized through hardware or through software functional units.

When the integrated units are realized through software functional units, and are sold and used as independent products, the integrated units may be stored on computer readable storage media. Based on this understanding, all or a part of the generic principles or the scope of the invention may be embodied in software products. The computer software products may be stored in storage media and may include a plurality of commands to instruct a computer system (such as personal computer, server, network system, etc.) or a processor to execute all or a part of the procedures described in various embodiments. The storage media may include U disk, mobile hard disk, read-only memory (ROM), random access memory (RAM), magnetic disk, optical disk, or any other appropriate media that can be used to store program code.

For example, the present disclosure may provide a non-transitory computer-readable storage medium containing computer-executable program instructions for, when executed by a processor, performing the disclosed method for image rotation and the disclosed method for image formation in accordance with various embodiments.

For illustration purposes, the disclosed methods and electronic devices are described based on the division of various functions of the modules. In actual applications, the various functions described above may be realized by different functional modules based on actual needs. That is, the internal structure of the electronic device may be divided into different functional modules in order to realize all or a part of the functions. The specific operation procedures of the systems, devices, and units described above may be referred to the corresponding description illustrated in various embodiments of the present disclosure.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for image rotation, comprising:
    obtaining a tilt angle and size information of a to-be-processed image data;
    obtaining position information of a target pixel corresponding to each rotated original pixel by performing a calculation based on the tilt angle and the size information of the to-be-processed image data and position information of each original pixel;
    obtaining an enhancement parameter value and an edge parameter value by filtering the each original pixel; and
    performing a two-dimensional interpolation process based on a plurality of neighboring pixels of the each original pixel, the enhancement parameter value, and the edge parameter value, and obtaining a target pixel value of the target pixel corresponding to the each original pixel according to an original pixel value of the each original pixel, the enhancement parameter value, and the edge parameter value, thereby obtaining a target image corresponding to the rotated to-be-processed image data.

2. The method according to claim 1, wherein:
    the size information includes height information and width information of the to-be-processed image data.

3. The method according to claim 1, wherein obtaining the position information of the target pixel corresponding to the each rotated original pixel by performing the calculation based on the tilt angle and the size information of the to-be-processed image data and position information of the each original pixel includes:
    obtaining original coordinate information of the each original pixel in a pre-established two-dimensional coordinate system;
    obtaining height information and width information of the target image according to the tilt angle, height information and width information of the to-be-processed image data;
    determining target coordinate information according to the original coordinate information, the tilt angle, the height information and the width information of the to-be-processed image data, and the height information and the width information of the target image using following formulas:

$p=(((2*i)-srcW)*\cos\Theta-((2*j)-srcH)*\sin\Theta+dstW)/2,$
    and $q=(((2*j)-srcH)*\cos\Theta-(srcW-(2*i))*\sin\Theta+dstH)/2,$ wherein i is abscissa information of the original coordinate information (i, j), j is ordinate information of the original coordinate information (i, j), p is abscissa information of the target coordinate information (p, q), and q is the ordinate information of the target coordinate information (p, q), srcW is the width information of the to-be-processed image data, srcH is the height information of the to-be-processed image data, $\Theta$ is the tilt angle, dstW is the width information of the target image, and dstH is the height information of the target image; and
    determining the position information of the target pixel according to the target coordinate information.

4. The method according to claim 1, after filtering the each original pixel, further including:
    obtaining original pixel values corresponding to neighboring pixels of the each original pixel;
    determining that the each original pixel is an unnoisy point when a sum of an original pixel value of the each original pixel and the original pixel values of the neighboring pixels is less than or equal to a preset pixel threshold; or determining that the each original pixel is a noisy point when the sum of the original pixel value of the original pixel and the original pixel values of the neighboring pixels is larger than the preset pixel threshold; and
    obtaining the enhancement parameter value and the edge parameter value according to a determination result of whether the each original pixel is a noisy point.

5. The method according to claim 4, wherein obtaining the enhancement parameter value and the edge parameter value according to the determination result of whether the each original pixel is the noisy point includes:
    obtaining the enhancement parameter value by filtering the each original pixel and the neighboring pixels through an enhancement filter that are preset, and by calculating the original pixel values of the neighboring pixels and the original pixel value of the each original pixel using a convolution method; and obtaining the edge parameter value by filtering the each original pixel and the neighboring pixels through an edge detection filter that are preset, and by calculating the original pixel values of the neighboring pixels and the original pixel value of the each original pixel using a convolution method, when the each original pixel is the unnoisy point; or
    determining the enhancement parameter value as a preset value, and obtaining the edge parameter value by filtering the each original pixel and the neighboring pixels through the edge detection filter, and by calculating the original pixel values of the neighboring pixels and the original pixel value of the each original pixel using a convolution method, when the each original pixel is the noisy point.

6. The method according to claim 1, wherein performing the two-dimensional interpolation process based on the plurality of neighboring pixels of the each original pixel, the enhancement parameter value and the edge parameter value, and obtaining the target pixel value of the target pixel corresponding to the each original pixel according to the original pixel value of the each original pixel, the enhancement parameter value and the edge parameter value includes:
    obtaining original coordinate information of the each original pixel and neighboring coordinate information of a preset number of neighboring pixels of the each original pixel in a pre-established two-dimensional coordinate system;
    obtaining original pixel values corresponding to the preset number of neighboring coordinate information, respectively; and
    obtaining a preset number of target neighboring pixels corresponding to the neighboring coordinate information by performing the two-dimensional interpolation process on the preset number of neighboring coordinate information, wherein:
    the target pixel value of each target neighboring pixel is half of a sum of the original pixel value of the corresponding neighboring coordinate information, the enhancement parameter value and the edge parameter value, and
    the target pixel value of the target pixel corresponding to the each original pixel is half of a sum of the original pixel value of the each original pixel, the enhancement parameter value and the edge parameter value.

7. The method according to claim 6, wherein obtaining the preset number of target neighboring pixels corresponding to the neighboring coordinate information by performing the two-dimensional interpolation process on the preset number of neighboring coordinate information includes:
   obtaining three target neighboring pixels by performing the two-dimensional interpolation process on three neighboring coordinate information, wherein the original coordinate information of the each original pixel is (i, j), and the three neighboring coordinate information are (i+1, j), (i, j+1), (i+1, j+1), respectively;
   obtaining target pixel values of the three target neighboring pixels using following formulas:

$$DST(floor(p+abs(\sin \Theta)), floor(q)) = (f(i+1,j)+edge1+edge2)/2,$$

$$DST(floor(p), floor(q+abs(\sin \Theta))) = (f(i,j+1)+edge1+edge2)/2, \text{ and}$$

$$DST(floor(p+abs(\sin \Theta)), floor(q+abs(\sin \Theta))) = (f(i+1,j+1)+edge1+edge2)/2; \text{ and}$$

obtaining the target pixel value of the target pixel corresponding to the each original pixel using following formula:

$$DST(floor(p), floor(q)) = (f(i,j)+edge1+edge2)/2,$$

wherein 'abs' represents an absolute value, 'floor' represents rounding, 'edge1' is the enhancement parameter value, 'edge2' is the edge parameter value, 'Θ' is the tilt angle, f(i, j) is the original pixel value corresponding to the original coordinate information (i, j), DST (floor (p), floor (q)) is the target pixel value of the target pixel corresponding to the original pixel (i, j), f (i+1, j) is the original pixel value corresponding to the neighboring coordinate information (i+1, j), f (i, j+1) is the original pixel value corresponding to the neighboring coordinate information (i, j+1), f (i+1, j+1) is the original pixel value corresponding to the neighboring coordinate information (i+1, j+1), DST(floor(p+abs(sin Θ)), floor(q)), DST(floor(p), floor(q+abs(sin Θ))), and DST (floor(p+abs(sin Θ)), floor(q+abs(sin Θ))) are the target pixel values of the three target neighboring pixels corresponding to the three neighboring coordinate information (i+1, j), (i, j+1), (i+1, j+1), respectively.

8. A device for image rotation, comprising:
   a memory, storing program instructions for a method for image rotation; and
   one or more processors, coupled to the memory and, when executing the program instructions, configured for:
   obtaining a tilt angle and size information of a to-be-processed image data,
   obtaining position information of a target pixel corresponding to the each rotated original pixel by performing a calculation based on the tilt angle and the size information of the to-be-processed image data and position information of the each original pixel,
   obtaining an enhancement parameter value and an edge parameter value by filtering the each original pixel, and
   performing a two-dimensional interpolation process based on a plurality of neighboring pixels of the each original pixel, the enhancement parameter value, and the edge parameter value, and obtaining a target pixel value of the target pixel corresponding to the each original pixel according to an original pixel value of the each original pixel, the enhancement parameter value, and the edge parameter value, thereby obtaining a target image corresponding to the rotated to-be-processed image data.

9. The device according to claim 8, wherein the one or more processors are further configured for:
   obtaining original coordinate information of the each original pixel in a pre-established two-dimensional coordinate system;
   obtaining height information and width information of the target image according to the tilt angle, height information and width information of the to-be-processed image data;
   determining target coordinate information according to the original coordinate information, the tilt angle, the height information and the width information of the to-be-processed image data, and the height information and the width information of the target image using following formulas:

$$p = (((2*i)-srcW)*\cos \Theta - ((2*j)-srcH)*\sin \Theta + dstW)/2,$$
   and $$q = (((2*j)-srcH)*\cos \Theta - (srcW-(2*i))*\sin \Theta + dstH)/2,$$

wherein i is abscissa information of the original coordinate information (i, j), j is ordinate information of the original coordinate information (i, j), p is abscissa information of the target coordinate information (p, q), q is the ordinate information of the target coordinate information (p, q), srcW is the width information of the to-be-processed image data, srcH is the height information of the to-be-processed image data, Θ is the tilt angle, dstW is the width information of the target image, and dstH is the height information of the target image; and
   determining the position information of the target pixel according to the target coordinate information.

10. The device according to claim 8, wherein the one or more processors are further configured for:
   obtaining original pixel values corresponding to neighboring pixels of the each original pixel;
   determining that the each original pixel is an unnoisy point when a sum of an original pixel value of the each original pixel and the original pixel values of the neighboring pixels is less than or equal to a preset pixel threshold; or
   determining that the each original pixel is a noisy point when the sum of the original pixel value of the each original pixel and the original pixel values of the neighboring pixels is larger than the preset pixel threshold; and
   obtaining the enhancement parameter value and the edge parameter value according to a determination result of whether the each original pixel is a noisy point.

11. The device according to claim 10, wherein the one or more processors are further configured for:
   obtaining the enhancement parameter value by filtering the each original pixel and the neighboring pixels through an enhancement filter that are preset, and by calculating the original pixel values of the neighboring pixels and the original pixel value of the each original pixel using a convolution method; and obtaining the edge parameter value by filtering the each original pixel and the neighboring pixels through an edge detection filter that are preset, and by calculating the original pixel values of the neighboring pixels and the original pixel value of the each original pixel using a convolution method, when the each original pixel is the unnoisy point; or determining the enhancement parameter value as a preset value, and obtaining the edge parameter value by filtering the each original pixel and the neighboring pixels through the edge detection filter, and by calculating the original pixel values of the neighboring pixels and the original pixel value of the each original pixel using a convolution method when the each original pixel is the noisy point.

12. The device according to claim 8, wherein the one or more processors are further configured for:
obtaining original coordinate information of the each original pixel and neighboring coordinate information of a preset number of neighboring pixels of the each original pixel in a pre-established two-dimensional coordinate system;
obtaining original pixel values corresponding to the preset number of neighboring coordinate information, respectively; and
obtaining a preset number of target neighboring pixels corresponding to the neighboring coordinate information by performing the two-dimensional interpolation process on the preset number of neighboring coordinate information, wherein:
the target pixel value of each target neighboring pixel is half of a sum of the original pixel value of the corresponding neighboring coordinate information, the enhancement parameter value and the edge parameter value, and
the target pixel value of the target pixel corresponding to the each original pixel is half of a sum of the original pixel value of the each original pixel, the enhancement parameter value and the edge parameter value.

13. The device according to claim 12, wherein the one or more processors are further configured for:
obtaining three target neighboring pixels by performing the two-dimensional interpolation process on three neighboring coordinate information, wherein the original coordinate information of the each original pixel is (i, j), and the three neighboring coordinate information are (i+1, j), (i, j+1), (i+1, j+1), respectively;
obtaining target pixel values of the three target neighboring pixels using following formulas:

$$DST(floor(p+abs(\sin \Theta)), floor(q)) = (f(i+1,j)+edge1+edge2)/2,$$

$$DST(floor(p), floor(q+abs(\sin \Theta))) = (f(i,j+1)+edge1+edge2)/2, \text{ and}$$

$$DST(floor(p+abs(\sin \Theta)), floor(q+abs(\sin \Theta))) = (f(i+1,j+1)+edge1+edge2)/2; \text{ and}$$

obtaining the target pixel value of the target pixel corresponding to the each original pixel using following formula:

$$DST(floor(p), floor(q)) = (f(i,j)+edge1+edge2)/2,$$

wherein 'abs' represents an absolute value, 'floor' represents rounding, 'edge1' is the enhancement parameter value, 'edge2' is the edge parameter value, 'Θ' is the tilt angle, f(i, j) is the original pixel value corresponding to the original coordinate information (i, j), DST (floor (p), floor (q)) is the target pixel value of the target pixel corresponding to the each original pixel (i, j), f (i+1, j) is the original pixel value corresponding to the neighboring coordinate information (i+1, j), f (i, j+1) is the original pixel value corresponding to the neighboring coordinate information (i, j+1), f (i+1, j+1) is the original pixel value corresponding to the neighboring coordinate information (i+1, j+1), DST(floor(p+abs(sin Θ)), floor(q)), DST(floor(p), floor(q+abs(sin Θ))), and DST(floor(p+abs(sin Θ)), floor(q+abs(sin Θ))) are the target pixel values of the three target neighboring pixels corresponding to the three neighboring coordinate information (i+1, j), (i, j+1), (i+1, j+1), respectively.

14. An apparatus for image formation, comprising:
a memory, storing program instructions for a method for image formation; and
one or more processors, coupled to the memory and, when executing the program instructions, configured for:
obtaining a to-be-processed image data by scanning an original document or receiving from external, and
detecting a tilt angle and size information of the to-be-processed image data, used for image rotation, the image rotation including:
obtaining the tilt angle and the size information of the to-be-processed image data,
obtaining position information of a target pixel corresponding to each rotated original pixel by performing a calculation based on the tilt angle and the size information of the to-be-processed image data and position information of each original pixel,
obtaining an enhancement parameter value and an edge parameter value by filtering the each original pixel, and
performing a two-dimensional interpolation process based on a plurality of neighboring pixels of the each original pixel, the enhancement parameter value, and the edge parameter value, and obtaining a target pixel value of the target pixel corresponding to the each original pixel according to an original pixel value of the each original pixel, the enhancement parameter value, and the edge parameter value, thereby obtaining a target image corresponding to the rotated to-be-processed image data.

15. The apparatus according to claim 14, wherein the one or more processors are further configured for:
based on a predetermined portion of the to-be-processed image data, detecting the predetermined portion and outputting a tilt angle and size information corresponding to the predetermined portion for the image rotation, and
repeatedly detecting an additional predetermined portion and outputting a tilt angle and size information of the additional predetermined portion, until an entire to-be-processed image data corresponding to the original document are detected.

16. The apparatus according to claim 14, wherein the one or more processors are further configured for:
obtaining original coordinate information of the each original pixel in a pre-established two-dimensional coordinate system;
obtaining height information and width information of the target image according to the tilt angle, height information and width information of the to-be-processed image data;
determining target coordinate information according to the original coordinate information, the tilt angle, the height information and the width information of the to-be-processed image data, and the height information and the width information of the target image using following formulas:

$$p = (((2*i)-srcW)*\cos \Theta - ((2*j)-srcH)*\sin \Theta + dstW)/2,$$
and $$q = (((2*j)-srcH)*\cos \Theta - (srcW-(2*i))*\sin \Theta + dstH)/2,$$

wherein i is abscissa information of the original coordinate information (i, j), j is ordinate information of the original coordinate information (i, j), p is abscissa information of the target coordinate information (p, q), q is the ordinate information of the target coordinate information (p, q), srcW is the width information of the to-be-processed image data, srcH is the height information of the to-be-processed image data, $\Theta$ is the tilt angle, dstW is the width information of the target image, and dstH is the height information of the target image; and determining the position information of the target pixel according to the target coordinate information.

17. The apparatus according to claim 14, wherein the one or more processors are further configured for:
   obtaining original pixel values corresponding to neighboring pixels of the each original pixel;
   determining that the each original pixel is an unnoisy point when a sum of an original pixel value of the each original pixel and the original pixel values of the neighboring pixels is less than or equal to a preset pixel threshold; or
   determining that the each original pixel is a noisy point when the sum of the original pixel value of the each original pixel and the original pixel values of the neighboring pixels is larger than the preset pixel threshold; and
   obtaining the enhancement parameter value and the edge parameter value according to a determination result of whether the each original pixel is a noisy point.

18. The apparatus according to claim 17, wherein the one or more processors are further configured for:
   obtaining the enhancement parameter value by filtering the each original pixel and the neighboring pixels through an enhancement filter that are preset, and by calculating the original pixel values of the neighboring pixels and the original pixel value of the each original pixel using a convolution method; and obtaining the edge parameter value by filtering the each original pixel and the neighboring pixels through an edge detection filter that are preset, and by calculating the original pixel values of the neighboring pixels and the original pixel value of the each original pixel using a convolution method, when the each original pixel is the unnoisy point; or
   determining the enhancement parameter value as a preset value, and obtaining the edge parameter value by filtering the each original pixel and the neighboring pixels through the edge detection filter, and by calculating the original pixel values of the neighboring pixels and the original pixel value of the each original pixel using a convolution method when the each original pixel is the noisy point.

19. The apparatus according to claim 14, wherein the one or more processors are further configured for:
   obtaining original coordinate information of the each original pixel and neighboring coordinate information of a preset number of neighboring pixels of the each original pixel in a pre-established two-dimensional coordinate system;
   obtaining original pixel values corresponding to the preset number of neighboring coordinate information, respectively; and
   obtaining a preset number of target neighboring pixels corresponding to the neighboring coordinate information by performing the two-dimensional interpolation process on the preset number of neighboring coordinate information, wherein:
   the target pixel value of each target neighboring pixel is half of a sum of the original pixel value of the corresponding neighboring coordinate information, the enhancement parameter value and the edge parameter value, and
   the target pixel value of the target pixel corresponding to the each original pixel is half of a sum of the original pixel value of the each original pixel, the enhancement parameter value and the edge parameter value.

20. The apparatus according to claim 19, wherein the one or more processors are further configured for:
   obtaining three target neighboring pixels by performing the two-dimensional interpolation process on three neighboring coordinate information, wherein the original coordinate information of the each original pixel is (i, j), and the three neighboring coordinate information are (i+1, j), (i, j+1), (i+1, j+1), respectively;
   obtaining target pixel values of the three target neighboring pixels using following formulas:

$DST(\text{floor}(p+\text{abs}(\sin \Theta)), \text{floor}(q)) = (f(i+1,j) + \text{edge1} + \text{edge2})/2,$ $DST(\text{floor}(p), \text{floor}(q+\text{abs}(\sin \Theta))) = (f(i,j+1) + \text{edge1} + \text{edge2})/2,$ and $DST(\text{floor}(p+\text{abs}(\sin \Theta)), \text{floor}(q+\text{abs}(\sin \Theta))) = (f(i+1, j+1) + \text{edge1} + \text{edge2})/2;$ and obtaining the target pixel value of the target pixel corresponding to the each original pixel using following formula:

$DST(\text{floor}(p), \text{floor}(q)) = (f(i,j) + \text{edge1} + \text{edge2})/2,$ wherein 'abs' represents an absolute value, 'floor' represents rounding, 'edge1' is the enhancement parameter value, 'edge2' is the edge parameter value, '$\Theta$' is the tilt angle, f(i, j) is the original pixel value corresponding to the original coordinate information (i, j), DST (floor (p), floor (q)) is the target pixel value of the target pixel corresponding to the each original pixel (i, j), f (i+1, j) is the original pixel value corresponding to the neighboring coordinate information (i+1, j), f (i, j+1) is the original pixel value corresponding to the neighboring coordinate information (i, j+1), f (i+1, j+1) is the original pixel value corresponding to the neighboring coordinate information (i+1, j+1), DST(floor(p+abs(sin $\Theta$)), floor(q)), DST(floor(p), floor(q+abs(sin $\Theta$))), and DST(floor(p+abs(sin $\Theta$)), floor(q+abs(sin $\Theta$))) are the target pixel values of the three target neighboring pixels corresponding to the three neighboring coordinate information (i+1, j), (i, j+1), (i+1, j+1), respectively.

* * * * *